United States Patent [19]

Odagawa et al.

[11] Patent Number: 4,885,535
[45] Date of Patent: * Dec. 5, 1989

[54] MAGNETIC TILT SENSOR WITH PERMANENT MAGNET SURROUNDING MAGNETIC SENSING ELEMENT

[75] Inventors: Yoshimoto Odagawa; Yasushi Yanagisawa, both of Chiba, Japan

[73] Assignee: TDK Corporation, Tokyo, Japan

[*] Notice: The portion of the term of this patent subsequent to Feb. 7, 2006 has been disclaimed.

[21] Appl. No.: 209,064

[22] Filed: Jun. 20, 1988

[30] Foreign Application Priority Data

Jun. 22, 1987 [JP] Japan .................................. 62-153337

[51] Int. Cl.⁴ .............................................. G01B 7/14
[52] U.S. Cl. ...................................... 324/207; 33/364; 324/262
[58] Field of Search ................ 324/207, 208, 226, 236, 324/228, 234–235, 239, 243, 244, 259, 260, 261, 262, 345, 346; 33/364

[56] References Cited

U.S. PATENT DOCUMENTS

| | | | |
|---|---|---|---|
| 3,252,057 | 5/1966 | Hoeppel | 324/208 X |
| 3,305,805 | 2/1967 | Tann | 324/228 X |
| 3,397,347 | 8/1968 | Hoeppel | 324/208 X |
| 4,282,484 | 8/1981 | Morrow | 324/226 X |
| 4,316,145 | 2/1982 | Tann | 324/208 |
| 4,442,405 | 4/1984 | Andrejasich et al. | 324/207 X |
| 4,694,247 | 9/1987 | Meili et al. | 324/262 X |

FOREIGN PATENT DOCUMENTS

| | | | |
|---|---|---|---|
| 0108401 | 6/1983 | Japan | 324/208 |
| 0610020 | 5/1978 | U.S.S.R. | 324/208 |
| 0896380 | 1/1982 | U.S.S.R. | 324/208 |

Primary Examiner—Gerard R. Strecker
Assistant Examiner—Warren S. Edmonds
Attorney, Agent, or Firm—Burgess, Ryan & Wayne

[57] ABSTRACT

There is proposed a tilt sensor in which a first permanent magnet having a magnetic fluid adhered to its surface is housed in a nonmagnetic case, a magnetic sensing element is arranged outside a bottom portion of the case, and a second permanent magnet is arranged so as to surround the magnetic sensing element and have polarity directions opposite to those of the first permanent magnet. When the case is tilted at an angle larger than a predetermined angle, the first permanent magnet is instantaneously moved, and the magnet sensing element detects changes in magnetism, thereby detecting a tilt of the case.

6 Claims, 12 Drawing Sheets

MAGNETIC TILT SENSOR WITH PERMANENT MAGNET SURROUNDING MAGNETIC SENSING ELEMENT

BACKGROUND OF THE INVENTION

I. Field of the Invention

The present invention relates to a tilt sensor for detecting a tilt of an object when the object is tilted.

II. Description of the Prior Art

The present inventors have proposed a tilt sensor in which a permanent magnet having a surface coated with a magnetic fluid is housed in a hollow nonmagnetic case, and a magnetic sensing element responsive to magnetism of the permanent magnet is disposed outside a bottom portion of the case (U.S. patent application No. 112,626, and E.P.C. Application No. 87115618.8).

The above prior art will be described first with reference to FIG. 6.

Figure 6:
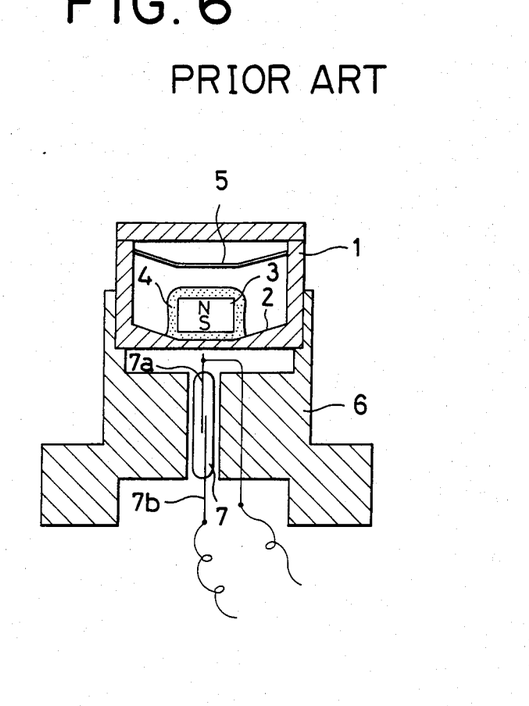
FIG. 6 is a sectional view of a prior art sensor.
Figure 7A:
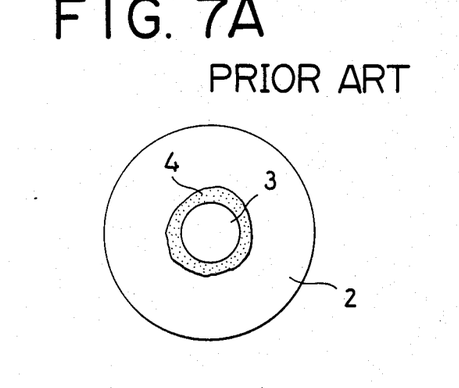
FIGS. 7A and 7B, FIG. 8, and FIGS. 9A, 9B and 9C are views for explaining the operation of the prior art in FIG. 6.
Figure 7B:
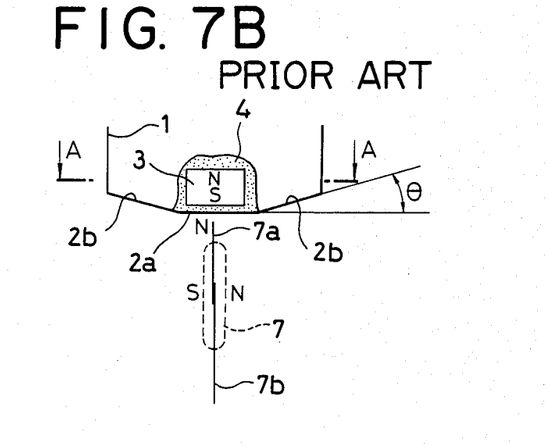

Referring to FIG. 6, reference numeral 1 denotes a nonmagnetic case made of, e.g., aluminum. As shown in FIGS. 7A and 7B, the hollow portion of the case 1 comprises a bottom portion 2 having a circular flat surface 2a constituting its central portion as a first bottom surface, and an annular inverted frustum surface 2b constituting its peripheral portion as a second bottom surface defining a predetermined angle $\theta$ with the flat surface 2a. FIG. 7A is a sectional view taken along the line A—A in FIG. 7B. Reference numeral 3 denotes a substantially disk-like permanent magnet having its surface coated with a magnetic fluid 4. The magnetic fluid 4 is prepared by dispersing magnetic metal powder (e.g., cobalt, iron, or nickel powder) particles having a diameter of 50 Å to 150 Å in a liquid (e.g., kerosene or water) having a relatively low viscosity. Generally, a surface-active agent is added to the magnetic fluid 4. Reference numeral 5 denotes a cover disposed at a predetermined height from the bottom portion 2 so as to prevent the permanent magnet 3 from being turned upside down; 6, a mounting base; and 7, a reed switch serving as a nonlinear magnetic sensing element disposed outside the bottom portion 2 of the case 1. One end portion of one lead 7a is positioned near the central portion of the bottom portion 2. One end portion of the other lead 7b is positioned away from the bottom portion 2.

An operation of this prior art will be described below. FIG. 7B shows a state wherein the case 1 is not tilted. The flat surface 2a of the bottom central portion is horizontal. In this case, since the permanent magnet 3 is located on the flat surface 2a, one end portion of one lead 7a of the reed switch 7 is located near the permanent magnet 3. As a result, one end portion of the lead 7a is influenced by the magnetism of the permanent magnet 3, and hence is polarized to the N pole, whereas the other end thereof (an intermediate portion of the reed switch) is polarized to the S pole. Furthermore, since one end portion of the other lead 7b located near the S pole is polarized to the N pole, both the reeds attract each other and are connected. That is, if a circuit is connected to the leads 7a and 7b, this circuit is closed.

Figure 8:
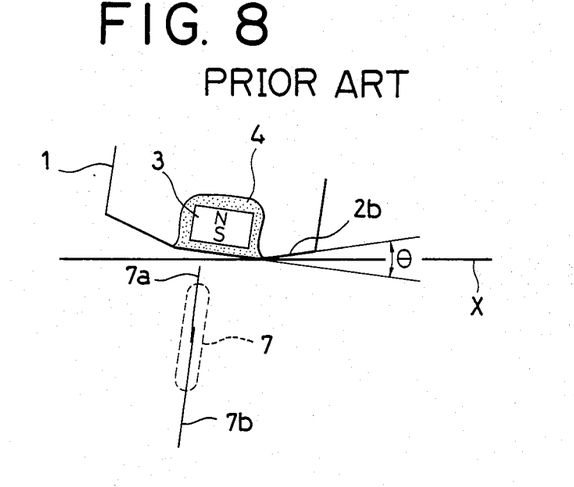

Assume that the case 1 is tilted in a given direction, as shown in FIG. 8. When a tilt angle of the case 1 is small, since the frustum surface 2b is still ascending at a certain angle with respect to a horizontal plane X, the permanent magnet 3 is located near the central flat portion. Therefore, the lead 7a of the reed switch 7 is influenced by the magnetism of the permanent magnet 3, and hence both the reeds are held in a connected state.

Figure 9A:
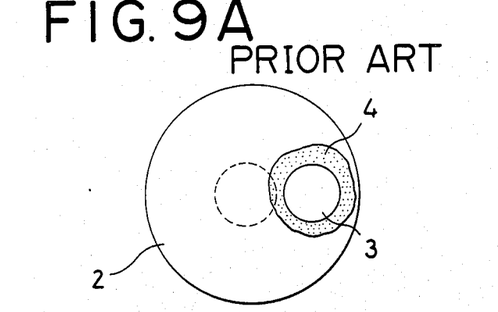
Figure 9B:
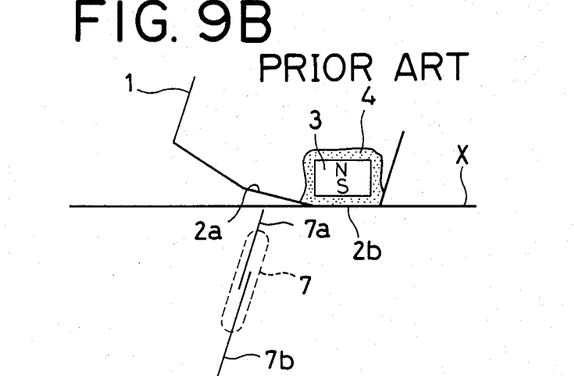
Figure 9C:
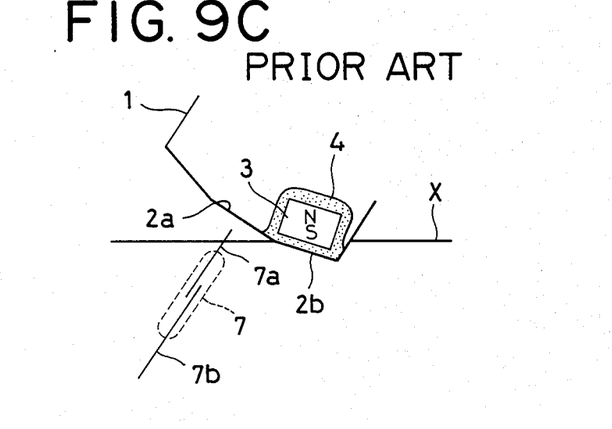

As shown in FIGS. 9A and 9B, when the case 1 is further tilted at an angle $\theta$ defined by the flat surface 2a of the substantially central portion and the frustum (in practice, at an angle slightly larger than $\theta$, as shown in FIG. 9C, because of the viscosity of the magnetic fluid), and the frustum surface 2b becomes a descending surface, the permanent magnet 3 is quickly and completely moved from the central flat surface 2a to the frustum surface 2b by its weight. That is, the position of the permanent magnet 3 is nonlinearly changed with respect to the central flat surface 2a. When the permanent magnet is moved, since the magnetic fluid 4 serves as a lubricating oil, the resistance to the movement is very small so that the permanent magnet 3 can be easily moved to the lowest position of the bottom portion. In this case, one end of one lead 7a of the reed switch 7 is quickly moved out of the substantially influential range of the magnetism of the permanent magnet 3, i.e., nonlinearly moved out of the range. As a result, the magnetization is substantially lost, and the magnetic attraction between the leads 7a and 7b is eliminated, thereby opening the switch.

As is apparent from the above description, in the prior art, when the case is tilted at an angle larger than a predetermined angle, the reed switch is quickly, i.e., nonlinearly opened. With this operation, it can be clearly detected that the case is tilted at an angle larger than the predetermined angle. In addition, when the case is returned to its original position, the permanent magnet is also returned to the central flat surface portion, so that the reed switch is quickly, i.e., nonlinearly closed.

However, since the magnetic flux of the permanent magnet 3 constitutes a magnetic path running through the reed switch 7 and returning to the permanent magnet 3, the viscosity of the magnetic fluid 4 is reduced in the above-described prior art. In addition, a force for attracting the permanent magnetic 3 to the reed switch 7 is generated, and hence the permanent magnet 3 tends to be urged against the bottom portion 2 of the case 1. For this reason, even if the tilt of the tilt sensor is changed, the permanent magnet 3 may not be smoothly moved on the bottom portion 2. Another drawback is that the movement of the permanent magnet 3 tends to be delayed with respect to tilting of the tilt sensor.

SUMMARY OF THE INVENTION

It is a first object of the present invention to provide a tilt sensor in which a permanent magnet can be quickly moved in response to tilting of the tilt sensor so as to improve detection sensitivity.

In order to achieve this object, a second permanent magnet is arranged to surround a magnetic sensing element for detecting the magnetism of a first permanent magnet while positioning it at a central portion of the second permanent magnet and to have polarity directions opposite to those of the first permanent magnet.

According to this arrangement, the magnetic fluxes of the first permanent magnet to be moved in accordance with a tilt of the tilt sensor and of the second permanent magnet surrounding the magnetic sensing element cancel each other. In addition, the first permanent magnet is repelled by the second permanent magnet, and this generates a floating force. As a result, resistance to the movement of the first permanent magnet is greatly decreased, and hence sensitivity is improved.

It is a second object of the present invention to provide a high-precision tilt sensor which can be reliably operated at a desired tilt angle.

The relative distance between the first permanent magnet and the magnetic sensing element greatly influences the sensitivity and the response angle of the tilt sensor. For this reason, the tilt sensor of the present invention comprises a means for adjusting the distance from a first case housing the first permanent magnet to a second case housing the magnetic sensing element and the second permanent magnet.

With this arrangement, the distance between the first permanent magnet and the magnetic sensing element can be adjusted, and a desired response angle can be accurately set.

The above and other objects, features, and advantages of the present invention will be apparent from the following detailed description of embodiments in conduction with the accompanying drawings.

Figure 1:
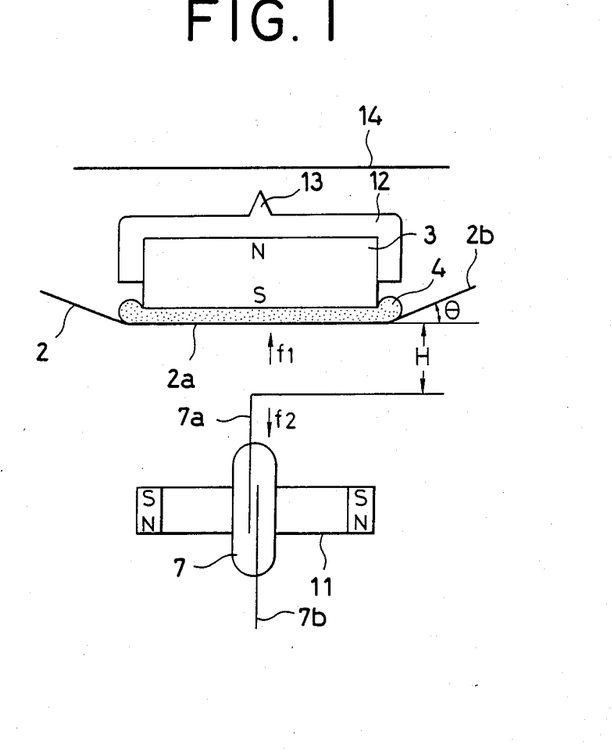
FIG. 1 is a schematic elevational view for explaining the principle of the present invention.

DETAILED DESCRIPTION OF THE PREFERRED EMBODIMENTS:

FIG. 1 is a view for explaining the principle of the present invention. A bottom portion 2 (having a tilt center) of a case, a permanent magnet 3, a magnetic fluid 4, and a reed switch 7 have the same functions as those of the prior art in FIG. 6. Reference numeral 11 denotes an axially magnetized annular permanent magnet, which surrounds the magnetic sensing element, i.e., the reed switch 7 and is arranged coaxially therewith. The polarity directions of the permanent magnet 11 are opposite to those of the permanent magnet 3. Reference numeral 12 denotes a saucer-like cap covering the permanent magnet 3 in the case at a position opposite to the permanent magnet 11. The saucer-like cap 12 consists of a magnetic or nonmagnetic body and has a conical projection 13 at its outer central peak. Reference numeral 14 denotes an inner surface of a cover of the case.

An operation of the tilt sensor will be described below.

An upward magnetic path f1 in FIG. 1 is formed in the reed switch 7 by the permanent magnet 3, whereas a downward magnetic path f2 is formed by the permanent magnet 11. Since the magnetic paths run in the opposite directions, their magnetic fluxes cancel each other. Therefore, the leads 7a and 7b of the reed switch 7 are set in an open state. When the sensor is tilted, since the permanent magnet 3 is displaced with respect to the bottom portion 2 in the same manner as in FIG. 9, the magnetic flux density of the magnetic path f1 in the reed switch 7 is decreased. As a result, the leads 7a and 7b of the reed switch 7 are greatly influenced by the magnetic path f2 and are closed. When the tilt sensor is returned to its original position, the influence of the magnetic path f1 is increased, and hence the magnetic fluxes of both the magnetic paths cancel each other. As a result, the leads 7a and 7b are opened. When the permanent magnet 3 moves from a circular flat surface 2a of a central portion, which is a first bottom surface, to an inverted frustum surface 2b, which is a second bottom surface defining a predetermined angle $\theta$ with the flat surface 2a, or vice versa, if the tilt sensor is tilted at the angle $\theta$ from the vertical plane, or is returned from a tilt angle larger than the angle $\theta$ to the tilt angle of $\theta$, the permanent magnet 3 is rapidly moved and the magnetic flux density of the magnetic path f1 is also rapidly changed. Thus, the opening/closing operation of the leads 7a and 7b is quickly performed in the same manner as in the above-described prior art. In practice, however, the switching operation is slightly delayed in terms of a tilt angle.

As described above, in the prior art, the fluidity of the magnetic fluid 4 is degraded because of the magnetic flux of the magnetic path f1. In addition, since the permanent magnet 3 tends to be slightly attracted toward the reed switch 7, delay in movement of the permanent magnet 3 in terms of a tilt angle is increased. In the present invention, however, since the magnetic fluxes of the magnetic paths f1 and f2 cancel each other, delay in movement of the permanent magnet 3 is reduced, and no practical problem is posed.

Referring to FIG. 1, the cap 12 is used to add its weight to the weight of permanent magnet 3. In addition, if the cap 12 is constituted by a magnetic body, since the magnetic flux runs therethrough, the amount of magnetic fluid attached to the permanent magnet 3 or the cap 12 is decreased.

The distal end of the conical projection 13 formed on the outer central peak of the cap 12 is brought into contact with the inner surface 14 of the cover so as to prevent the permanent magnet 3 and the cap 12 from being toppled or upset. In addition, the conical projection 13 prevents the cap 12 from tightly attaching to the inner surface 14 of the cover.

In the tilt sensor of FIG. 1, if a distance H from the first bottom surface 2a of the bottom portion 2 of the case to the lead 7a of the reed switch 7 is changed, a degree of cancellation of the magnetic fluxes of both the permanent magnets is also changed. Consequently, the sensitivity of the tilt sensor and a tilt angle to which the lead switch is responsive are changed. Therefore, by adjusting the distance H, sensitivity and a response angle can be adjusted.

Figure 2A:
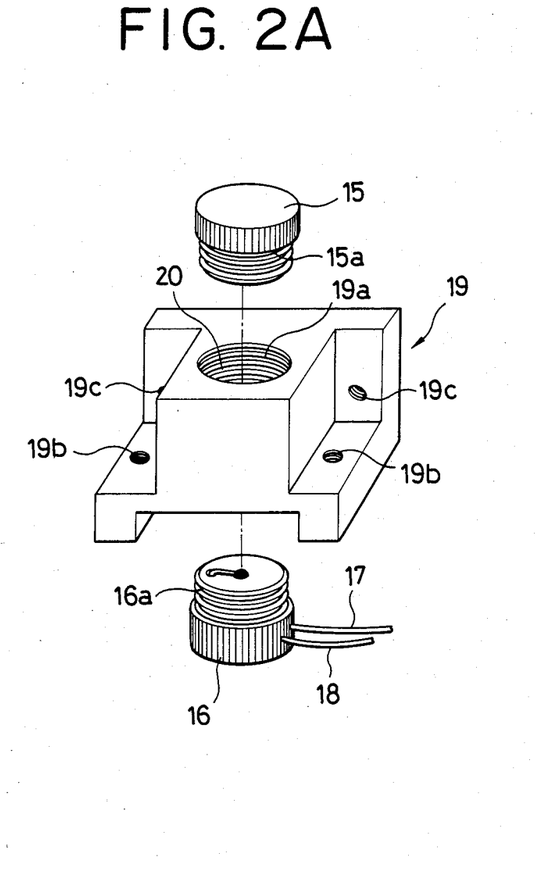
FIG. 2A is an exploded perspective view showing an embodiment of the present invention.
Figure 2B:
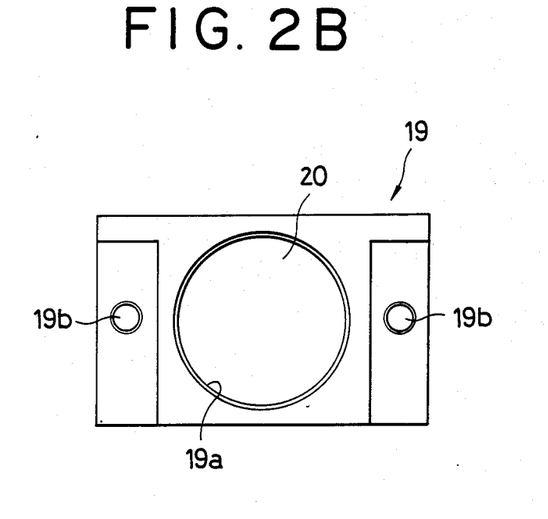
FIG. 2B is a plan view of a mounting base of the embodiment shown in FIG. 2A.

FIG. 2A is an exploded perspective view showing an embodiment of the present invention, wherein the sensitivity and the response angle can be adjusted, and the tilt sensor can be attached to a horizontal or vertical surface. FIG. 2B is a plan view of a mounting base.

Figure 2C:
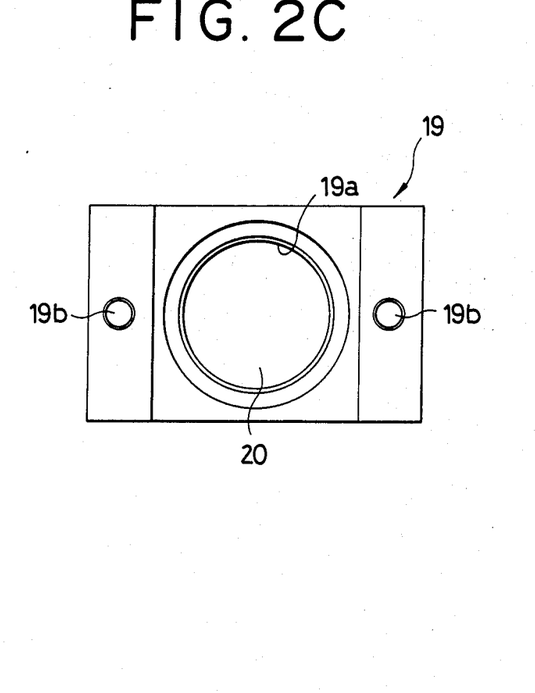
FIG. 2C is a rear view of the embodiment shown in FIG. 2A.
Figure 2D:
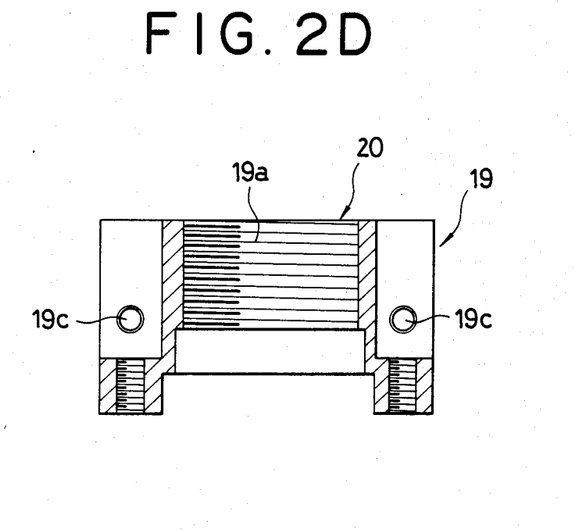
FIG. 2D is a longitudinal sectional view of the embodiment shown in FIG. 2A.

FIG. 2C is a rear view of the mounting base. FIG. 2D is a longitudinal sectional view of the mounting base.

Referring to FIGS. 2A to 2D, reference numeral 15 denotes a first case housing the permanent magnet 3, the cap 12, and the magnetic fluid 4 in FIG. 1, and having male threads 15a formed in its outer surface; 16, a second case housing the reed switch 7 and the permanent magnet 11 in FIG. 1, and having male threads 16a formed in its outer surface; 17 and 18, leads of the reed switch 7; and 19, a mounting base, in which a vertical through hole 20 is formed at the center, female threads 19a to be meshed with the male threads 15a and 16a are formed, and horizontal and vertical surface mounting screw holes 19b and 19c are respectively formed. In practice, the first and second cases 15 and 16 are threadably engaged with the mounting base 19, and the mounting base 19 is mounted on a horizontal or vertical surface. By rotating the first or second case 15 or 16, the distance H in FIG. 1 is adjusted to adjust the sensitivity of the tilt sensor or the response angle.

Figure 3:
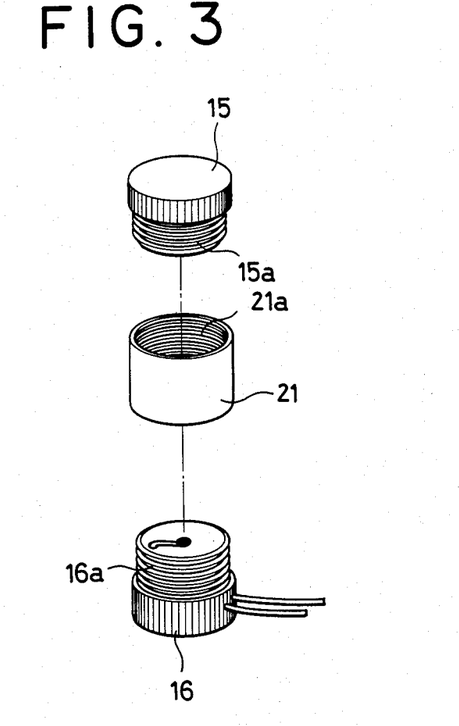
FIG. 3 is a perspective view showing another embodiment of the present invention.

FIG. 3 shows another embodiment of the present invention, wherein the first and second cases 15 and 16 are connected to each other using an intermediate ring 21. Female threads 21a to be meshed with the male threads 15a and 16a are formed in the inner surface of the intermediate ring 21. In practice, the bottom surface of the second case 16 is fixed to a horizontal surface. The distance H in FIG. 1 is adjusted by rotating the intermediate ring 21 or the first case 15.

Figure 4A:
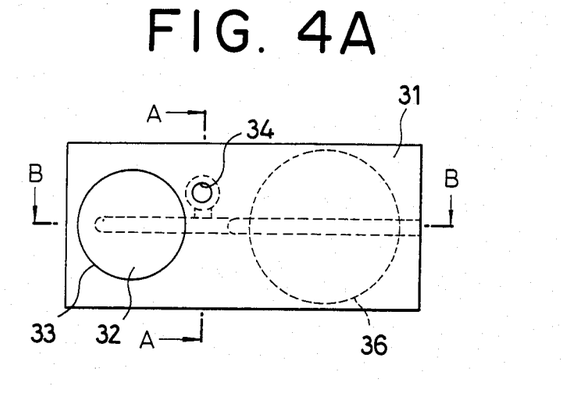
FIG. 4A is a plan view of a display unit used when the tilt sensor of the present invention is used.
Figure 4B:
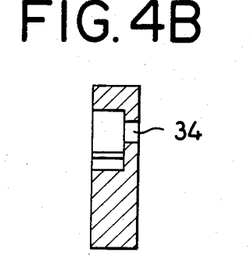
FIG. 4B is a sectional view taken along the line A—A in FIG. 4A.
Figure 4C:
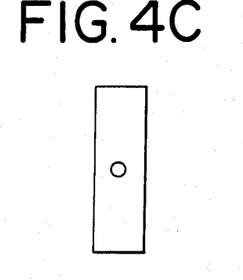
FIG. 4C is a side view of FIG. 4A.
Figure 4D:
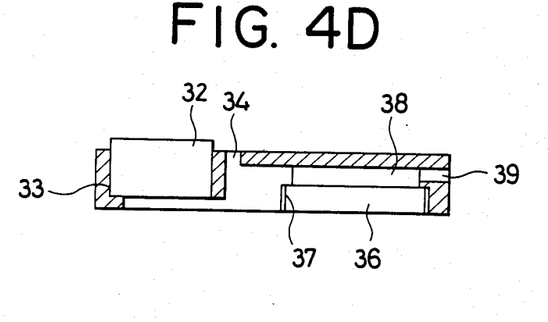
FIG. 4D is a sectional view taken along the line B—B in FIG. 4A.
Figure 5:
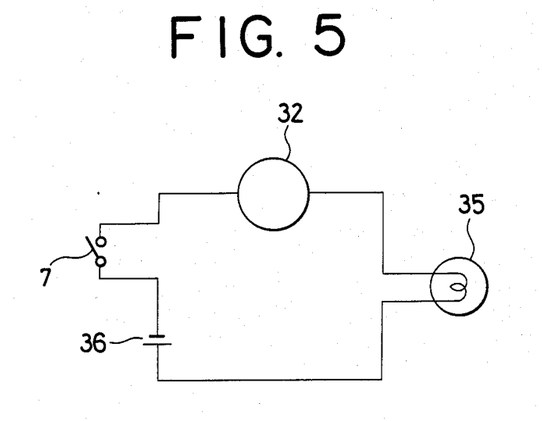
FIG. 5 is a circuit diagram of the display unit.

FIGS. 4A, 4B, 4C, and 4D show a display unit to be used when the tilt sensor of the present invention is used. FIG. 4A is a plan view of the display unit. FIG. 4B is a sectional view taken along the line A—A in FIG. 4A. FIG. 4C is a right side view of the display unit. FIG. 4D is a sectional view taken along the line B—B in FIG. 4A. FIG. 5 shows a circuit diagram of this display unit. Referring to these drawings, reference numeral 31 denotes a flat substrate made of a synthetic resin. A hole 33 for allowing a buzzer 32 to be fitted and stored therein, and a through hole 34 for storing a display lamp 35 are formed in the upper surface of the flat substrate 31, and a hole 37 for allowing a battery 36 to be fitted and stored therein, and a groove 38 for wiring are formed in its lower surface. Furthermore, an opening 39 for a connection line to the reed switch 7 is formed in its right side surface. The buzzer 32 and the display lamp 35 are urged/held against/at the substrate 31 side by being simply soldered to the wiring. When the reed switch 7 is closed, the buzzer 32 is operated and the display lamp 35 is turned on.

According to the embodiments of FIGS. 2 and 3, the first and second cases are coupled to the coupling member by the threads. However, coupling may be performed by other proper means, e.g., a sliding means having proper friction, or the cases may be directly coupled to each other.

As has been described above, according to the present invention, the following excellent effects can be obtained:

(A) Since the annular permanent magnet having polarity directions opposite those of the permanent magnet in the case is concentrically arranged around the reed switch, delay in operation of the tilt sensor can be greatly reduced.

(B) The sensitivity and the response angle of the tilt sensor can be adjusted by adjusting the distance from the first case housing the permanent magnet and the magnetic fluid to the second case housing the reed switch and the annular permanent magnet surrounding it.

What is claimed is:

1. A magnetic tilt sensor comprising:
   a non-magnetic case having a hollow portion and a bottom surface with a tilt center;
   first permanent magnet means housed in said case;
   magnetic fluid means, adhered to at least a portion of said first permanent magnet means, for slidably supporting said first permanent magnet means on said bottom surface;
   magnetic sensing element means for sensing magnetism of said first permanent magnet means, said magnetic sensing element means being fixed at a position outside of the case adjacent said bottom surface; and
   second permanent magnet means for cancelling magnetic fluxes of the first permanent magnet means when said first permanent magnet means is supported on said bottom surface and is aligned with said tilt center, said second permanent magnet means surrounding said magnetic sensing element means and having polarity directions opposite to those of said first permanent magnet means.

2. A magnetic tilt sensor comprising:
   a first non-magnetic case having a hollow portion and a bottom surface with a tilt center;
   first permanent magnet means housed in said first case;
   magnetic fluid means, adhered to at least a portion of said first permanent magnet means for slidably supporting said first permanent magnet means on said bottom surface;
   magnetic sensing element means for sensing magnetism of said first permanent magnet means, said magnetic sensing element means being fixed at a position outside of the first case adjacent said bottom surface; and
   second permanent magnet means for weakening magnetic fluxes of the first permanent magnet means when said first permanent magnet means is supported on said bottom surface and is aligned with said tilt center, and second permanent magnet means surrounding said magnetic sensing element means and having polarity directions opposite to those of said first permanent magnet means,
   a second case which houses said magnetic sensing element means and said second permanent magnet means; and
   means for adjusting the distance between said first and second cases.

3. A sensor according to claim 2, wherein said means for adjusting the distance from said first case to said second case comprises male threads respectively formed in outer surfaces of said first and second cases, and a coupling member having female threads, with which said male threads of said first and second cases are respectively meshed from both ends of said female threads, and the distance from said first case to said second case is adjusted by a depth of threadable engagement of said male threads of each of said first and second cases with said female threads.

4. A sensor according to claim 3, wherein said coupling member also serves as a tilt sensor mounting base.

5. A sensor according to claim 3, wherein said coupling member is a cylindrical ring.

6. A sensor according to claim 2, wherein one of said first and second cases is directly coupled to the other.

* * * * *